C. ST. JAMES.
Thill Coupling.

No. 99,025.  Patented Jan. 18, 1870.

Witnesses:
A. W. Hinquist
Jno. E. Brooks

Inventor:
C. St. James
per Munn & Co
Attys

United States Patent Office.

CLEMENT ST. JAMES, OF PITTSFIELD, MASSACHUSETTS.

Letters Patent No. 99,025, dated January 18, 1870.

IMPROVEMENT IN THILL-COUPLINGS.

The Schedule referred to in these Letters Patent and making part of the same

*To all whom it may concern:*

Be it known that I, CLEMENT ST. JAMES, of Pittsfield, in the county of Berkshire, and State of Massachusetts, have invented a new and useful Improvement in Carriage-Clip; and I do hereby declare that the following is a full, clear, and exact description thereof, which will enable others skilled in the art to make and use the same, reference being had to the accompanying drawings, forming part of this specification, in which—

Similar letters of reference indicate corresponding parts.

My invention has for its object to furnish an improved carriage-clip, or thill and pole-coupling, which shall be simple in construction, easily made, inexpensive, and at the same time strong, durable, and noiseless; and It consists in the construction and combination of the various parts of the clips, as hereinafter more fully described.

Figure 1:
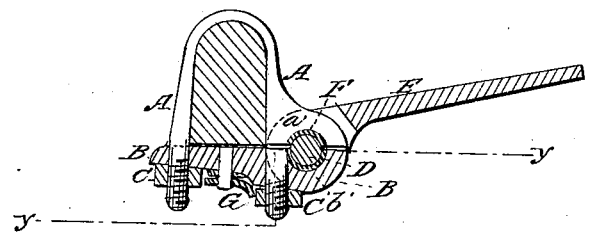
Figure 1 is a side view of my improved clip, partly in section, through the line $x\ x$, fig. 2.
Figure 2:
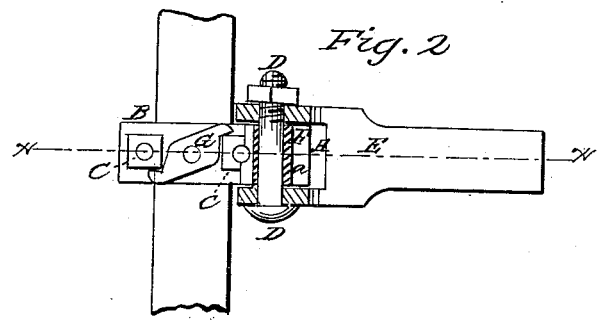
Figure 2 is an under side view of the same, partly in section, through the line $y\ y$, fig. 1.

A is the clip part of the coupling, upon the lower ends of which are formed bolts, having screw-threads cut upon them, which bolts pass through holes in the yoke B, and have nuts, C, placed upon their lower ends, as shown in figs. 1 and 2.

Upon the forward sides of the clip A and yoke B are formed projections $a'$ and $b'$, in the faces of which are formed semicircular transverse grooves, which, when the clip is secured in place, correspond with each other, and form a socket to receive the bolt, D, by means of which the thill-iron E is connected with the clip, the end of said thill-iron being slotted, to receive the projections $a'\ b'$, as shown in figs. 1 and 2.

The projections $a'\ b'$ are so formed that when secured in place, a narrow space may be left between them, so that they may be drawn closer together by screwing up the nuts C, to compensate for the wear of the parts.

The bolt-socket, formed in the projections $a'\ b'$, is made larger than the bolt D, and in it is placed a tubular washer, F, which is made open, so that it may be contracted or pressed together, to compensate for the wear.

The nuts C are kept from working loose or off by the bar G, the ends of which are notched, to fit upon the said nuts C, and which is pivoted to the lower side of the yoke B by a bolt or rivet passing through the said yoke B, midway between the two nuts C.

A brass washer is interposed between the lock-bar F and yoke B, as shown in fig. 1.

It should be observed that the bolts of the clip A should be made so long that the nuts C may be turned down, and the yoke B lowered, to allow the thill or pole-iron to be detached without detaching the parts of the clip.

The clip A may be kept in place, when the nuts C are loosened, by a staple or bar, secured with screws to the wooden part of the axle.

Having thus described my invention,

I claim as new, and desire to secure by Letters Patent—

1. The combination of the open tubular washer F, with the grooved projections $a'\ b'$ of the clip, and yoke A B, substantially as herein shown and described, and for the purpose set forth.

2. A clip, A, formed with threaded ends, and locked to the yoke by means of nuts C, held fixedly to any desired position by the bar G, as and for the purpose specified.

CLEMENT ST. JAMES.

Witnesses:
PETER CUMMINGS,
EDWIN CLAPP.